US009443174B2

(12) United States Patent
Ito

(10) Patent No.: US 9,443,174 B2
(45) Date of Patent: Sep. 13, 2016

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Morikazu Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/919,162

(22) Filed: Jun. 17, 2013

(65) Prior Publication Data

US 2013/0335779 A1 Dec. 19, 2013

(30) Foreign Application Priority Data

Jun. 19, 2012 (JP) ................................. 2012-137915

(51) Int. Cl.
*G06K 15/02* (2006.01)

(52) U.S. Cl.
CPC ....... *G06K 15/1817* (2013.01); *G06K 15/1849* (2013.01); *G06K 15/1863* (2013.01)

(58) Field of Classification Search
None
See application file for complete search history.

(56) References Cited

U.S. PATENT DOCUMENTS

| 5,805,174 A * | 9/1998 | Ramchandran ............... 345/501 |
| 2004/0246502 A1* | 12/2004 | Jacobsen et al. ............ 358/1.1 |
| 2005/0231516 A1* | 10/2005 | Zimmer ....................... 345/531 |
| 2007/0279705 A1* | 12/2007 | Takiyama .............. G06K 15/02 358/453 |
| 2010/0302564 A1* | 12/2010 | Ozawa ............... G06K 15/1849 358/1.9 |
| 2013/0335779 A1* | 12/2013 | Ito ............................... 358/1.16 |

FOREIGN PATENT DOCUMENTS

| JP | 2000-137825 A | 5/2000 |
| JP | 2002-169668 A | 6/2002 |
| JP | 2009-274366 A | 11/2009 |
| JP | 2010-238236 A | 10/2010 |

* cited by examiner

*Primary Examiner* — Tammy Pham
*Assistant Examiner* — Keara Harris
(74) *Attorney, Agent, or Firm* — Canon USA, Inc. I.P. Division

(57) ABSTRACT

An image processing apparatus rendering a plurality of objects includes a CPU cache used for rendering, a determination unit configured to determine whether a cache miss of the CPU cache occurs in rendering of the plurality of objects, and a rendering unit configured to, in a case where the determination unit determines that the cache miss occurs, execute division rendering processing for generating a bitmap corresponding to the plurality of objects by classifying the plurality of objects into a plurality of groups and for rendering the plurality of objects by each group so that the cache miss does not occur, and, in a case where the determination unit does not determine that the cache miss occurs, generate a bitmap corresponding to the plurality of objects by executing rendering without classifying the plurality of objects into the plurality of groups.

24 Claims, 10 Drawing Sheets

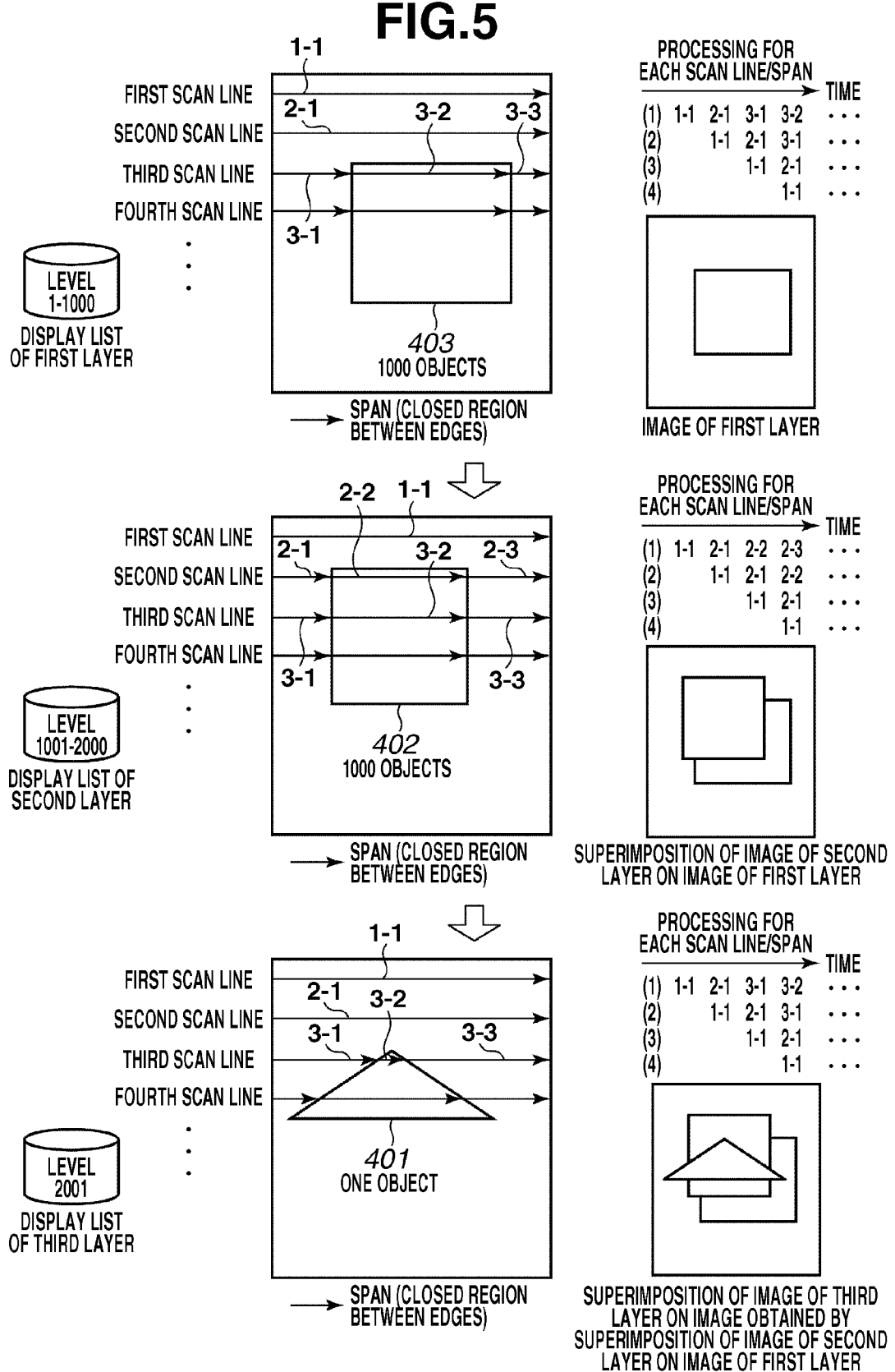

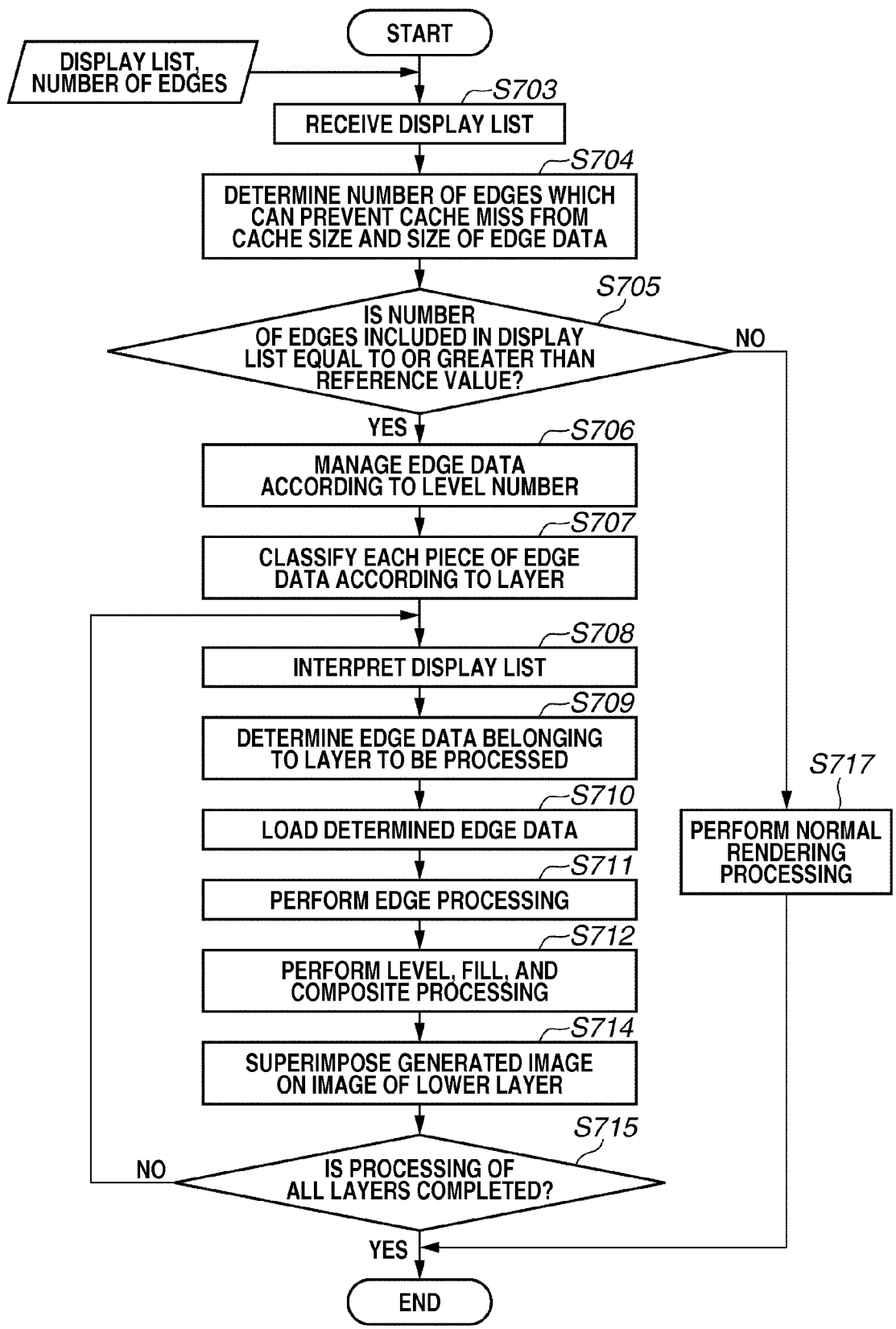

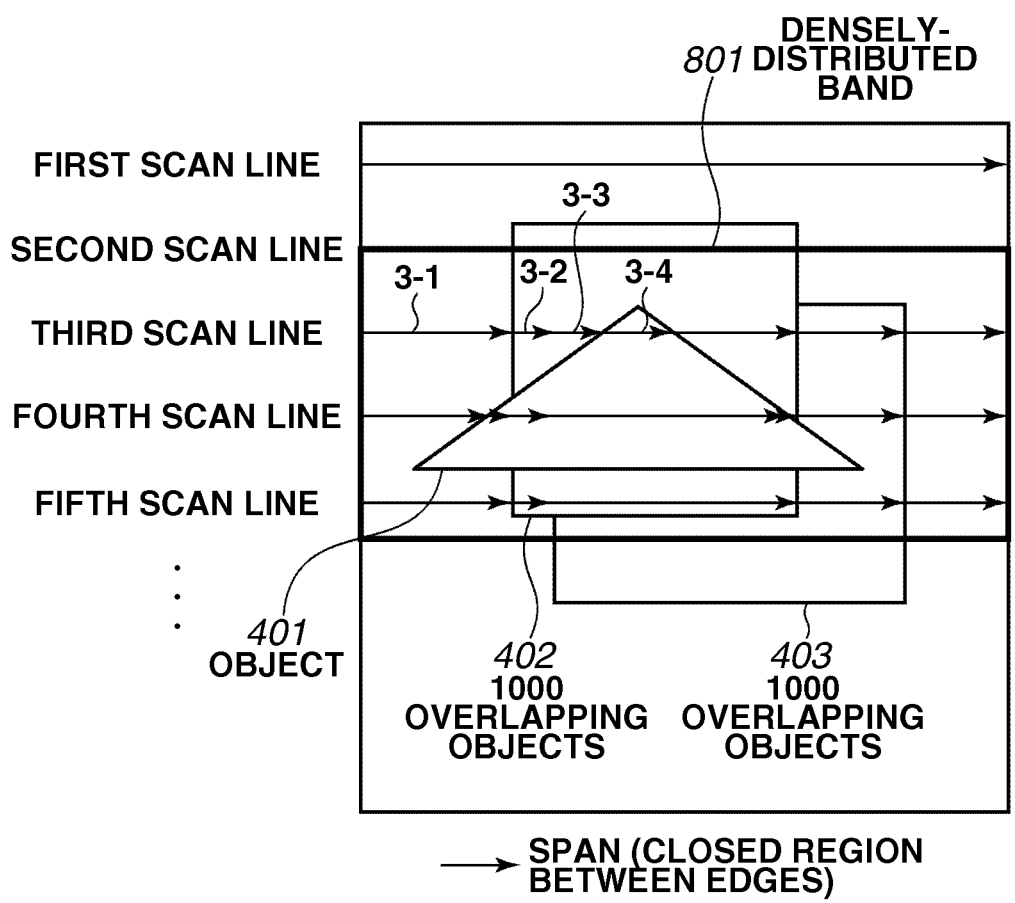

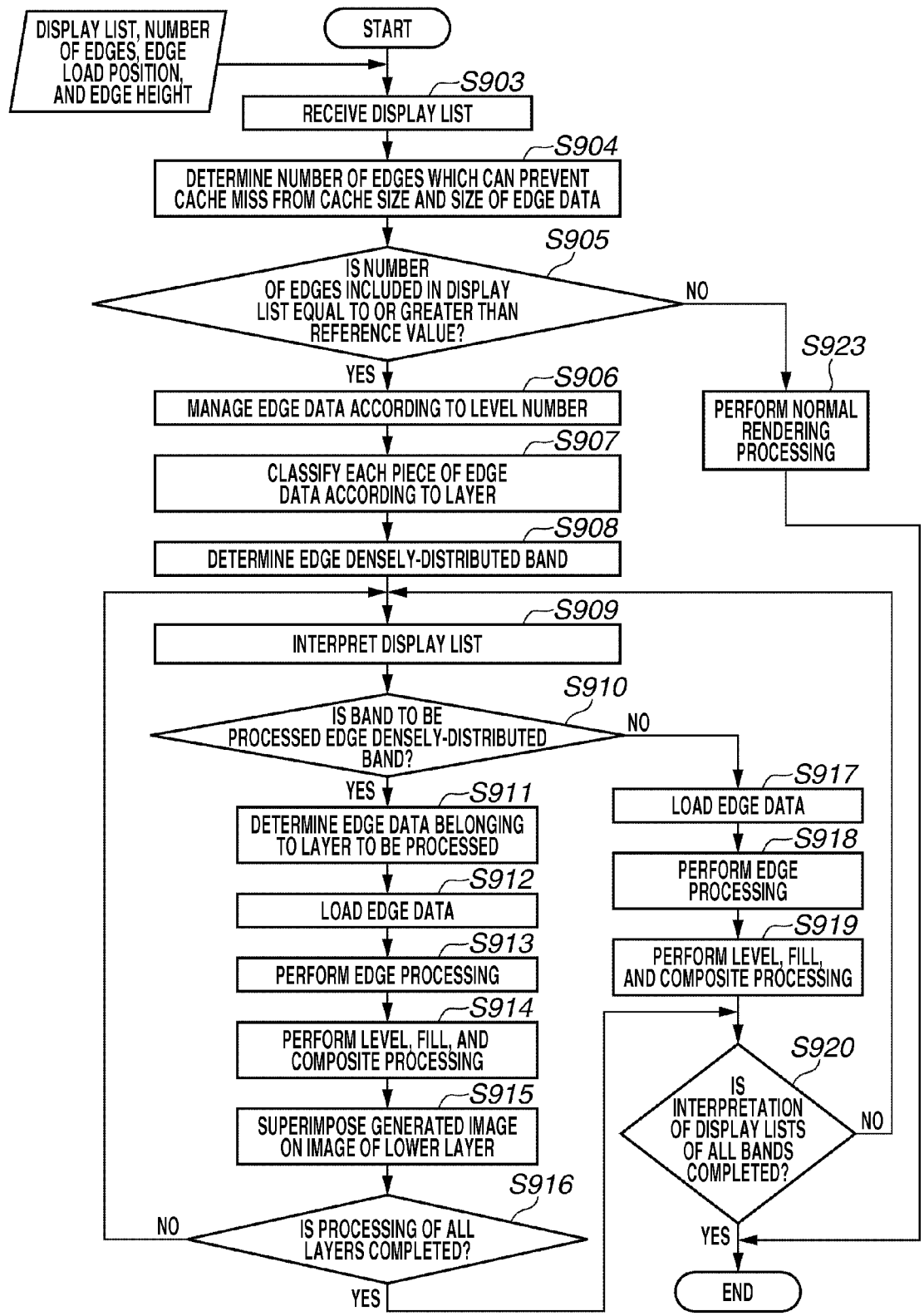

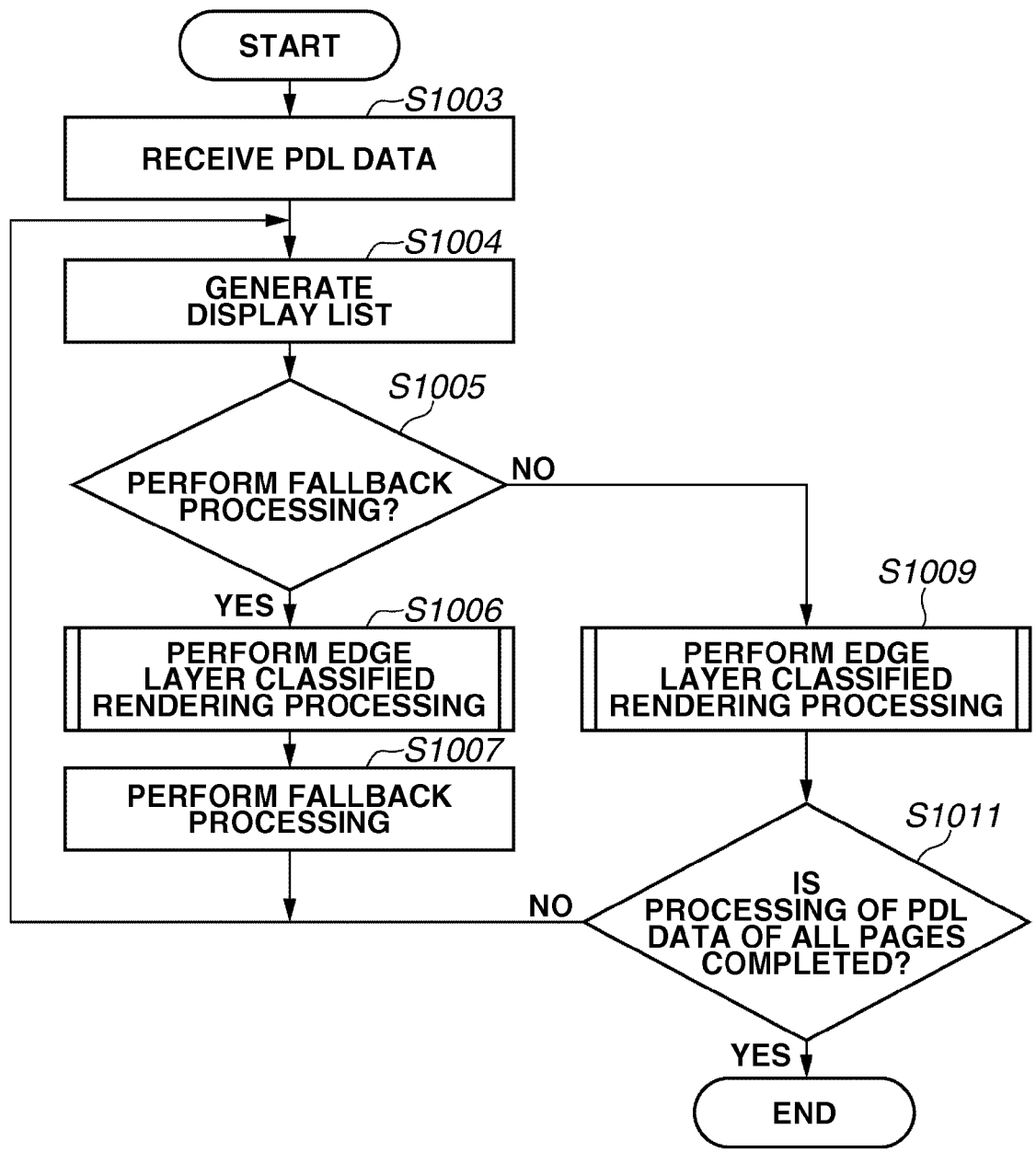

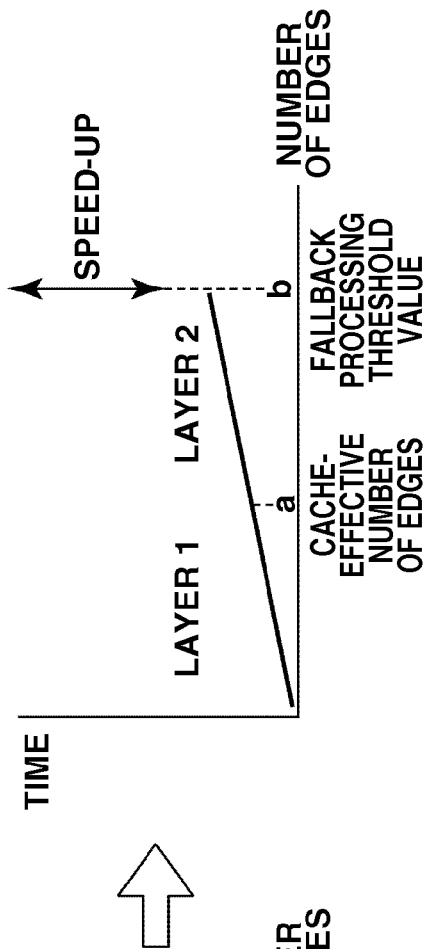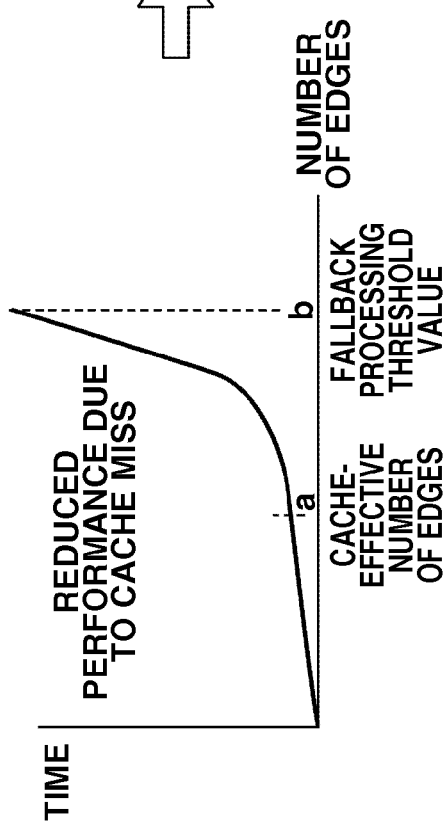

IMAGE PROCESSING APPARATUS, IMAGE PROCESSING METHOD, AND STORAGE MEDIUM

BACKGROUND OF THE INVENTION

1. Field of the Invention

The present invention relates to a rendering processing technique.

2. Description of the Related Art

Japanese Patent Application Laid-Open No. 2000-137825 discusses a rendering method called scan line rendering. According to the scan line rendering, print data is read each line in the main scanning direction when the data is rendered. The scan line rendering is performed based on information of an edge (edge data). An edge is a border between two image objects or between an image object and a background image to be rendered in a page. The image object is hereinafter referred to as an object. According to the method discussed in Japanese Patent Application Laid-Open No. 2000-137825, edge data of one line is loaded into a memory to perform the scan line rendering.

Print data to be rendered, which is generated by a user using application software, may include many edges and may be complicated due to enhancement of rendering capability of the application software. Thus, shortage of memory resources for the rendering tends to occur. Further, the rendering tends to take too much time.

As a rendering processing method for the print data including a great number of edges, Japanese Patent Application Laid-Open No. 2002-169668 discusses processing called fallback processing. According to the fallback processing, objects in page description language (PDL) data to be processed is grouped by level and a plurality of display lists is generated.

When print data including a great number of edges is rendered using the scan rendering processing discussed in Japanese Patent Application Laid-Open No. 2000-137825, if the fallback processing discussed in Japanese Patent Application Laid-Open No. 2002-169668 is used, the display lists can be generated by utilizing limited memory resources.

However, if the generated display lists, which are generated for each layer, include too many edges to be stored in a central processing unit (CPU) cache, a cache miss of the CPU cache may frequently occur. When such cache miss frequently occurs, rendering processing, especially edge processing, takes time. A cache miss refers to a failed attempt to read or write a piece of data in the cache, which results in a main memory access with much longer latency.

SUMMARY OF THE INVENTION

The present invention is directed to an image processing apparatus.

According to an aspect of the present invention, an image processing apparatus rendering a plurality of objects includes a CPU cache used for rendering, a determination unit configured to determine whether a cache miss of the CPU cache occurs in the rendering of the plurality of objects, and a rendering unit configured to, if the determination unit determines that the cache miss occurs, execute division rendering processing for generating a bitmap corresponding to the plurality of objects by classifying the plurality of objects into a plurality of groups and for rendering the plurality of objects for each group so that the cache miss does not occur, and, if the determination unit does not determine that the cache miss occurs, generate the bitmap corresponding to the plurality of objects by executing rendering without classifying the plurality of objects into the plurality of groups.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates edge layer classification processing.

FIG. 6 is a flowchart illustrating the edge layer classification processing.

FIG. 7 illustrates the edge layer classification processing of an edge densely-distributed portion.

FIG. 8 is a flowchart illustrating the edge layer classification processing of an edge densely-distributed portion.

FIG. 9 is a flowchart illustrating the rendering processing of the first exemplary embodiment.

FIGS. 10A and 10B illustrate effects of the edge layer classification processing according to the first exemplary embodiment.

DESCRIPTION OF THE EMBODIMENTS

Various exemplary embodiments, features, and aspects of the invention will be described in detail below with reference to the drawings.

<System Configuration>

Figure 1:
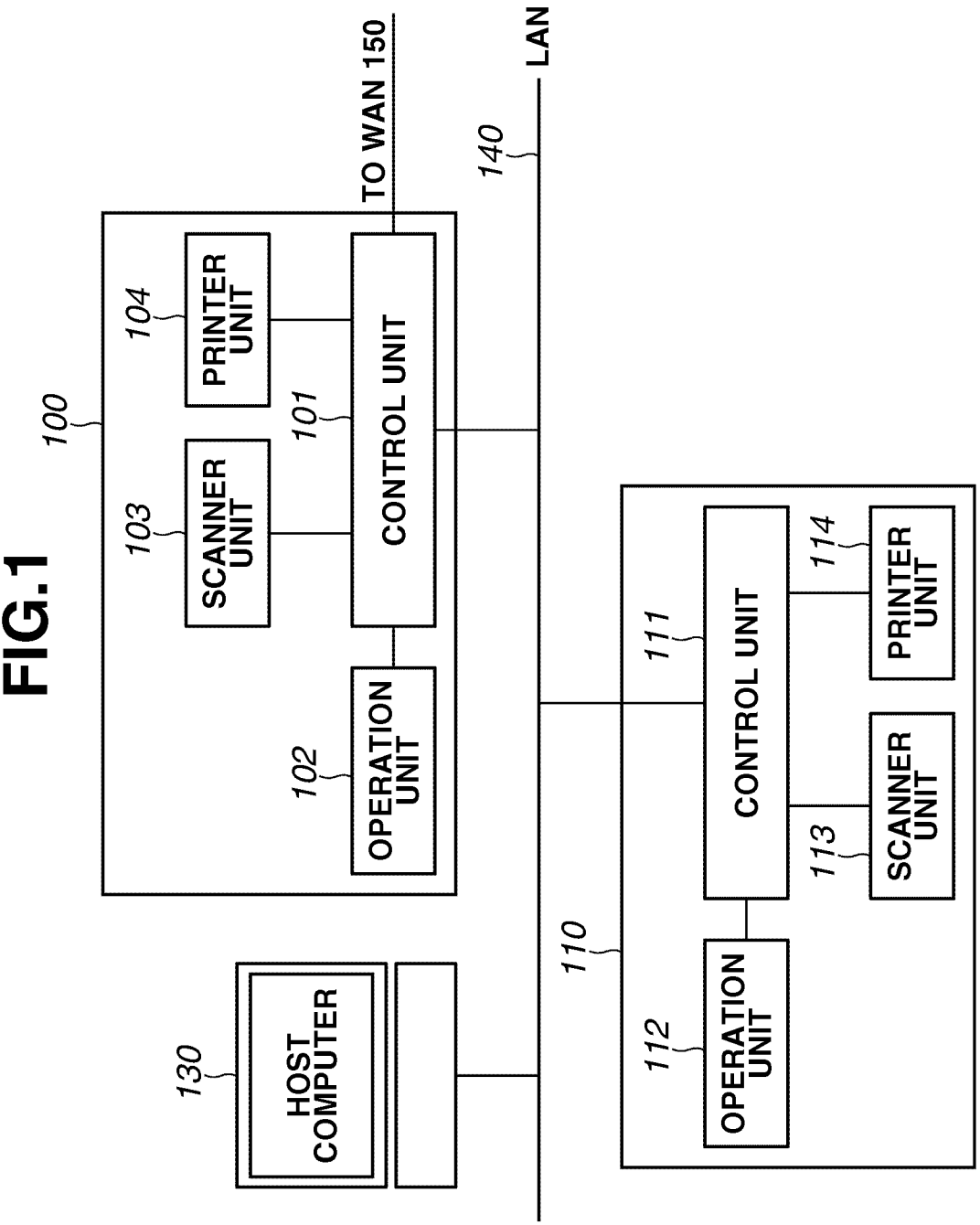
FIG. 1 illustrates a system configuration example of a first exemplary embodiment of the present invention.

FIG. 1 is a block diagram illustrating a configuration example of an image processing system according to an exemplary embodiment of the present invention. The system includes a host computer (information processing apparatus) 130 and image processing apparatuses 100 and 110, which are connected to a local area network (LAN) 140. Each of the image processing apparatuses 100 and 110 according to the present exemplary embodiment is a multi-function peripheral (MFP) which also serves as an image forming apparatus. Each of the image processing apparatuses 100 and 110 is not limited to a MFP and can also be a single function printer (SFP). Further, it can be a laser beam printer or an ink jet printer. Furthermore, the number of image forming apparatuses connected to the LAN does not limit the present invention. According to the present exemplary embodiment, although the image processing apparatus is connected to the LAN, the present invention is not limited to such an example. The image processing apparatus can be connected to an arbitrary network of a public line. For example, the image processing apparatus can be connected to a wide area network (WAN) 150. Additionally, a serial transmission method employing universal serial bus (USB) technology and a parallel transmission method employing Centronics and small computer system interface (SCSI) can also be used.

The host computer 130 has a function of a personal computer. The host computer 130 can transmit/receive a file or an electronic mail using a file transfer protocol (FTP) or a server message block (SMB) protocol via the LAN 140 or the WAN 150. Further, when a CPU (not illustrated) in the host computer 130 executes a printer driver program stored in a storage unit (not illustrated) in the host computer 130, the host computer 130 can instruct the image processing apparatuses 100 and 110 to perform printing.

The image processing apparatuses 100 and 110 of the present exemplary embodiment have a same inner configuration and each of them includes a scanner unit. In the descriptions below, the configuration of the image processing apparatus 100 is described and the description of the image processing apparatus 110 is not repeated.

The image processing apparatus 100 includes a control unit 101, an operation unit 102, a scanner unit 103, and a printer unit 104. The image processing apparatus 100 is connected to the LAN 140 and the WAN 150.

The control unit 101 is connected to each unit and controls an entire operation of the image processing apparatus 100 by controlling an operation of each unit. Further, the control unit 101 performs transmission/reception of image data via the host computer 130 and an apparatus (not illustrated) via the LAN 140 and the WAN 150. The operation unit 102 includes an input button and a display which also serves as a touch panel, and serves as a user interface (UI) which accepts print setting information input by the user. The print setting information input by the user is sent to the control unit 101. Further, the operation unit 102 displays an image based on an instruction sent from the control unit 101. The scanner unit 103 is an image input device which reads a document and sends an image of the document to the control unit 101. The printer unit 104 is an image output device which receives image data (bitmap data) processed by the control unit 101 and executes print processing based on the image data. In the description below, the image processing apparatus 100 is described as an example of the image processing apparatus of the present invention.

<Configuration of Image Processing Apparatus>

Figure 2:
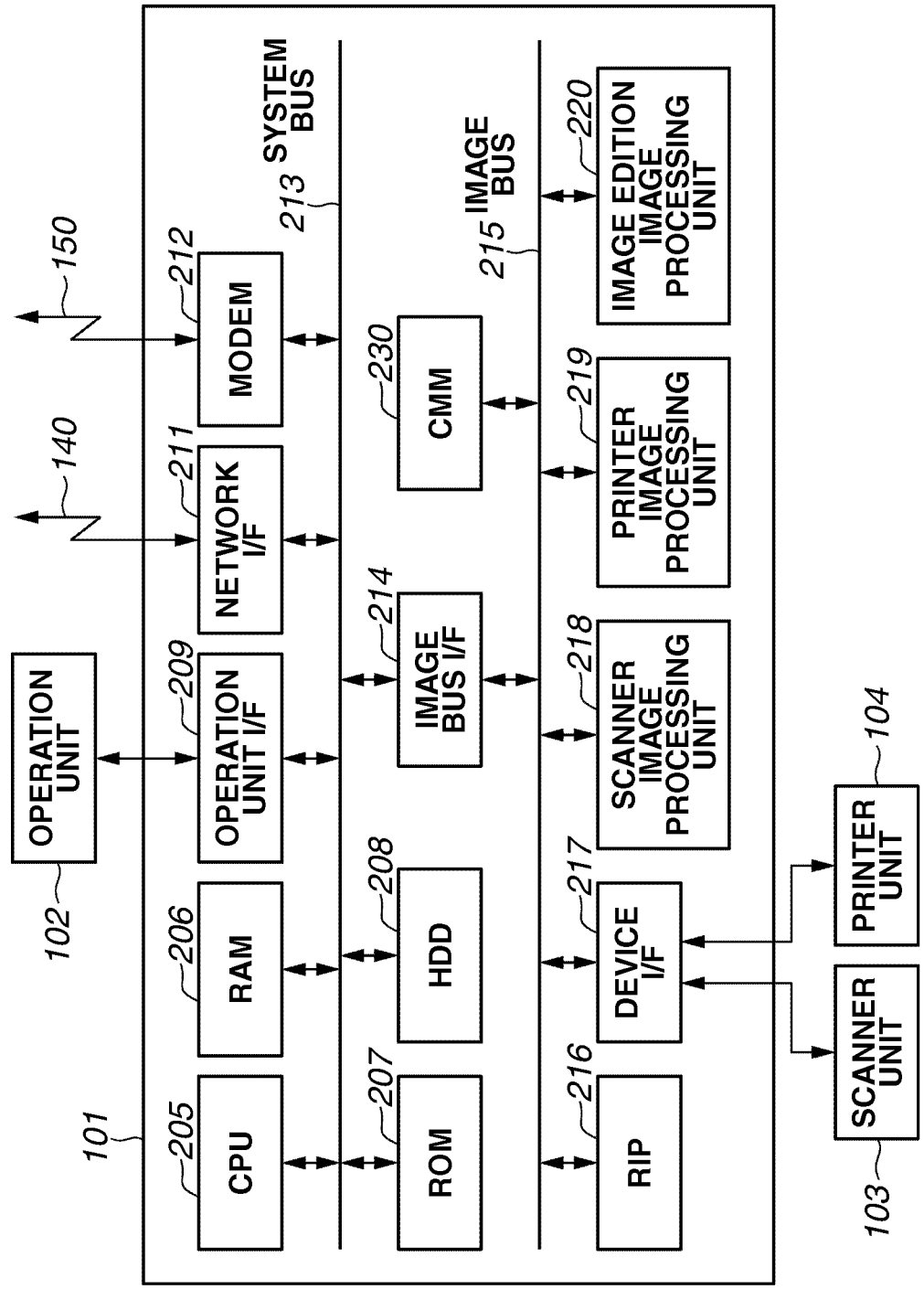
FIG. 2 illustrates a configuration example of an image processing apparatus according to the first exemplary embodiment.

FIG. 2 is a block diagram illustrating a configuration example of the image processing apparatus 100 according to the present exemplary embodiment.

A CPU 205 is a central processing unit which controls the entire image processing apparatus 100. The CPU 205 can include a plurality of CPUs. A random access memory (RAM) 206 is a work memory which is used when the CPU 205 operates, and is also used as an image memory that temporary stores image data which has been input. The RAM 206 is also called a main memory. In the following description, "main memory" refers to the RAM 206. A read-only memory (ROM) 207 is a boot ROM and stores a boot program of the system. A hard disk drive (HDD) 208 stores system software programs used for various types of processing and image data which has been input.

The CPU 205 according to the present exemplary embodiment is connected to a cache memory (not illustrated) including a static random access memory (SRAM) which is a low-capacity memory but allows high speed memory access. The cache memory is provided between the CPU 205 and the main memory, and is also connected to the main memory. When the CPU 205 obtains or updates information of data or commands, the cache memory conceals the delay regarding the access time to the main memory or the system bus and low bandwidth. In other words, the cache memory bridges a gap between the performance difference of the CPU 205 and the main memory. The cache memory stores a copy of data and information of the data which is stored in the main memory and accessed by the CPU 205. The information of the data is, for example, an address, state, and setting of the data. The cache memory performs input/output of the data with the CPU 205 in place of the main memory. If the CPU 205 includes a plurality of CPUs, each CPU has its own cache memory.

When the CPU 205 obtains data from a memory, if the data is stored in the cache memory, the CPU 205 can obtain the data from the cache memory instead of making access to the main memory. Accordingly, high speed access to the data is possible. As for the data not stored in the cache memory, since the CPU 205 needs to obtain the data from the main memory, data access will be low speed compared to when the data is stored in the cache memory. According to the present exemplary embodiment, when the CPU 205 sequentially accesses data in the main memory, each piece of data is copied to be stored in the cache memory. Since the data storage structure and the operation flow of the cache memory are publicly-known techniques, their descriptions are omitted here for brevity. The cache memory is hereinafter referred to as a CPU cache.

An operation unit I/F 209 is an interface which connects the operation unit 102 and the controller unit 101. The operation unit I/F 209 outputs image data which is used for displaying an operation screen to the operation unit 102. Further, the operation unit I/F 209 sends, for example, print setting information input by the user via the operation unit 102 to the CPU 205.

A network interface 211 is realized, for example, by a LAN card. When the network interface 211 is connected to the LAN 140, information can be exchanged with an external apparatus connected to the network. Further, a modem 212 is connected to the WAN 150. When the modem 212 is connected to the WAN 150, information can be exchanged with an external apparatus connected to the network. The above-described units are connected to a system bus 213.

An image bus I/F 214 is an interface unit that connects the system bus 213 and an image bus 215 which transfers image data at a high speed. The image bus I/F 214 is also a bus bridge that converts the data structure. A raster image processor (RIP) 216, a device I/F 217, a scanner image processing unit 218, a printer image processing unit 219, an image edition image processing unit 220, and a color management module (CMM) 230 are connected to the image bus 215.

The RIP 216 rasterizes a page description language code (PDL data) or vector data described below into bitmap data.

The device I/F 217 connects the scanner unit 103 and the printer unit 104 with the control unit 101, and performs synchronous/asynchronous conversion of image data.

The scanner image processing unit 218 performs various types of processing regarding the image data obtained from the scanner unit 103. For example, the scanner image processing unit 218 corrects, processes, and edits the image data. The printer image processing unit 219 corrects and performs the resolution conversion of the image data so that it can be printed by the printer engine of the printer unit 104. The image edition image processing unit 220 performs various types of image processing. For example, the image edition image processing unit 220 rotates, compresses, and decompresses the image data. The CMM 230 is a hardware module dedicated for color conversion processing (also called color space conversion processing) of image data based on a color profile or calibration data. The color profile is information such as a function used for converting color image data in a device-dependent color space into a deviceindependent color space (e.g., Lab). The calibration data is used for correcting a color reproduction characteristic of the scanner unit 103 or the printer unit 104 of the image processing apparatus 100.

<Terms Used in the Present Exemplary Embodiment>

Now, the terms used in the present exemplary embodiment will be defined.

An edge is a border between objects rendered in a page. It is also a border between an object and a background. In other words, an edge is an outline of an image object.

A span is a closed region between edges in a single scan line.

A level indicates a vertically-structured relationship of objects to be rendered in a page. A different level number is assigned to each object without exception.

A fill is fill information of a span. Regarding the fill of pixels of bitmap data or data corresponding to shading, each pixel may have a different color value. Regarding a solid fill, the color value is fixed in a span.

A scan line is a line in the main scanning direction of image data when the data is continuously scanned in the image forming processing. The height of the scan line is 1 pixel. A group of a plurality of scan lines is called a band.

A layer is a group of a plurality of edges grouped in the ascending order of the levels. For example, if one edge exists for each of levels having level numbers 1 to 3001 and if one layer includes 1000 edges, a backmost layer includes edges which correspond to the level numbers 1 to 1000. Further, an upper layer of that layer includes edges which correspond to the level numbers 1001 to 2000. Furthermore, an upper layer of that layer includes edges which correspond to the level numbers 2001 to 3000. A topmost layer includes an edge which corresponds to the level number 3001.

<Image Forming Processing>

The image forming processing executed by the image processing apparatus 100 according to the present exemplary embodiment will be described with reference to FIG. 9. The processing flow illustrated in FIG. 9 is executed by the control unit 101. More precisely, the processing flow is realized by the CPU 205 of the control unit 101 loading a system software program stored in the HDD 208 into the RAM 206 and executing it.

In step S1003, the control unit 101 receives PDL data. The PDL data according to the present exemplary embodiment is image data including a plurality of objects.

In step S1004, the control unit 101 generates a display list based on the PDL data received in step S1003 and stores the generated display list in a DL memory. The DL memory is a storage area of a display list in the main memory. More precisely, the control unit 101 interprets PDL data corresponding to one page from the top of the page to generate a display list of one page. According to an interpreted rendering instruction, the control unit 101 sequentially generates a display list. Thus, the control unit 101 functions as a display list generation unit configured to generate display lists corresponding respectively to the plurality of objects used for rendering of one or more objects. When the control unit 101 sequentially generates the display lists, the control unit 101 monitors a total size of the display lists stored in the DL memory, and determines whether the total size exceeds a predetermined threshold value. If the control unit 101 determines that the total size exceeds the predetermined threshold value, the control unit 101 determines that fallback processing is to be performed. Then, the control unit 101 stops the generation of the display list and sets the fallback determination to "ON". Then, the processing proceeds to step S1005. On the other hand, if the total size is equal to or less than the predetermined threshold value, the control unit 101 determines that the fallback processing is not to be performed. Then, the control unit 101 generates a display list of one page and sets the fallback determination to "OFF". The fallback processing will be described in detail in <Fallback processing> below. The control unit 101 functions as a fallback determination unit.

In step S1005, the control unit 101 determines whether the fallback processing is to be performed according to the result of the fallback determination. If the fallback determination is "ON" (YES in step S1005), the processing proceeds to step S1006. If the fallback determination is "OFF" (NO in step S1005), the processing proceeds to step S1009.

In step S1006, the control unit 101 performs edge layer classified rendering processing of the display list stored in the DL memory and generates a bitmap image. The edge layer classified rendering processing is also simply called classified rendering processing.

In step S1007, the control unit 101 executes the fallback processing. The fallback processing will be described below. In this step, the control unit 101 superimposes the bitmap image which has been generated according to the edge layer classified rendering processing on a background image. Then, the control unit 101 reduces the data size by compressing the superimposed bitmap. The control unit 101 stores the compressed bitmap image as a display list of the background image in the DL memory. Regarding the first fallback processing, since the background image does not exist, the result of the superposition processing will be the bitmap image generated in step S1006.

In step S1009, the control unit 101 performs the edge layer classified rendering processing of the display list stored in the DL memory and generates a bitmap image.

In step S1011, the control unit 101 determines whether the rendering processing of the PDL data of all pages which has been input is completed. If the rendering processing of all pages is not yet completed (NO in step S1011), the processing returns to step S1004. If the rendering processing of all pages is completed (YES in step S1011), the processing ends. After the processing in this flowchart is completed, the rendering-completed bitmap image is subjected to image processing. Then, the processed image is sent to the printer unit 104 and printed.

<Fallback Processing>

The fallback is processing described in the background technique. The fallback processing may be executed when a display list is generated from PDL data. When a display list is generated from PDL data, if the size of the PDL data which has been input is too large, the memory required for storing all the display lists may exceed the memory capacity of the DL memory.

In such a case, the control unit 101 generates a display list of a size that can be stored in the DL memory from the PDL data that corresponds to some of the plurality of objects. Then, the control unit 101 executes the rendering processing of the generated display list and generates a bitmap. When the bitmap is generated, the control unit 101 deletes the display list from the DL memory. Further, the control unit 101 reduces the data size of the generated bitmap by performing irreversible compression, such as JPEG compression, and stores the compressed bitmap in the DL memory as a display list of the background image. Then, the control unit 101 stores the display list generated from the rest of the PDL data in a free space of the DL memory which has been generated by the compression of the bitmap.

Then, the control unit 101 superimposes the bitmap obtained by newly rendering the display list generated from the PDL data on the bitmap as the background image already subjected to the rendering. The control unit 101 obtains the bitmap to be finally sent to the printer unit 104 according to the superposition processing of the bitmap.

The above-described processing is the fallback processing. Whether the fallback processing is to be performed is determined according to whether the control unit 101 determines that the total amount of display list stored in the DL memory exceeds a predetermined threshold value.

Now, the superposition processing performed in the fallback processing in step S1007 will be described. The background image regarding the superposition processing of the bitmap in the fallback processing is a bitmap of a size of one page already generated by the rendering processing. The background image is compressed and the display list of the background image is stored in the DL memory. If a background image exists when the rendering processing is performed, the control unit 101 loads the compressed background image and performs the superposition processing when a display list to be processed is rendered. In other words, when the fallback processing is performed, image data obtained by loading compressed image data can be used for the superposition. On the other hand, according to the superposition processing of image data in step S714 in FIG. 6 or step S915 in FIG. 8 described below, the image data which is subjected to the superposition processing is uncompressed data of upper and lower layers after the rendering processing. In other words, the superposition processing of the image data executed in steps S714 and S915 is different from the superposition processing of the image data in the fallback processing since it is not superposition using compressed image data.

<Rendering Processing Method of Display List>

Figure 3A:
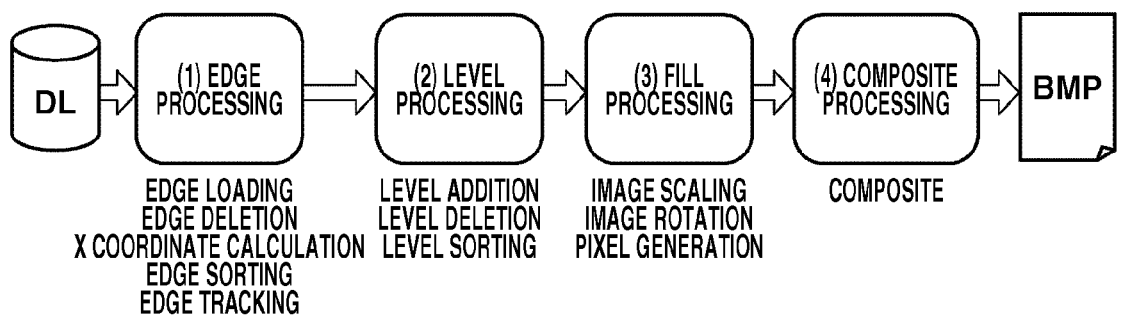
FIGS. 3A, 3B, and 3C illustrate rendering processing.
Figure 3B:
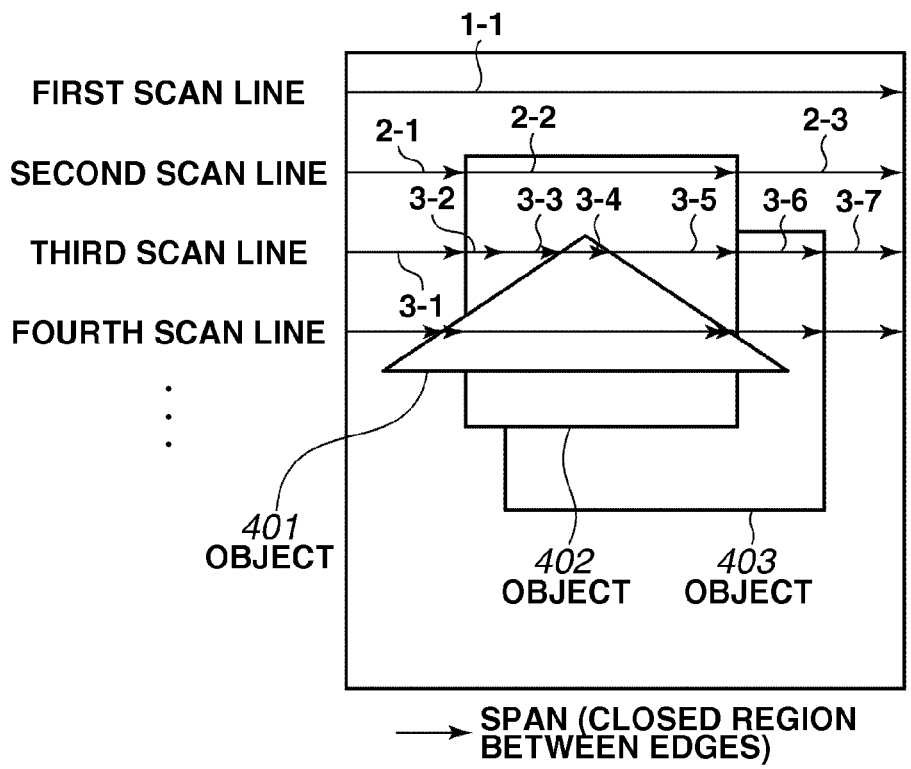
Figure 3C:
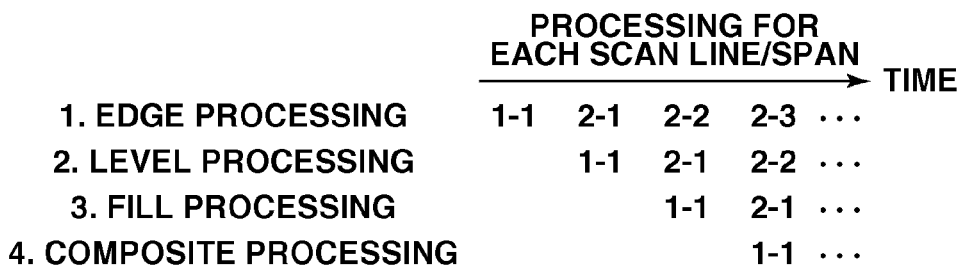

FIGS. 3A, 3B, and 3C illustrate the rendering processing method called scan line rendering. The processing below is executed by the control unit 101. More precisely, the scan line rendering is realized by the CPU 205 in the control unit 101 loading a program of the scan line rendering stored in the HDD 208 into the RAM 206 and executing the program.

FIG. 3A is a block diagram illustrating the processing flow of the scan line rendering processing according to the present exemplary embodiment. The scan line rendering processing is roughly divided into four types of processing which are edge processing, level processing, fill processing, and composite processing. Details of each type of processing are described below. If the CPU 205 includes a plurality of CPUs, different types of processing can be assigned to each CPU. More precisely, if the CPU 205 includes four CPUs, for example, a first, a second, a third, and a fourth CPUs can be dedicated for the edge processing, the level processing, the fill processing, and the composite processing, respectively.

<Edge Processing>

The edge processing is roughly divided into five types of processing.

Edge loading is processing which is performed when edge data of an outline of an object is loaded from a display list stored in the DL memory into the main memory. The edge load processing can be referred to as loading processing of edge data into the main memory so that the edge data can be managed as a link list described below.

The loaded edge data is subjected to X coordinate calculation processing. When the X coordinate calculation processing is performed, the X coordinate that indicates the edge position is calculated based on an edge tilt and a fill rule for each scan line.

The edges on the scan line which is being processed are sorted from the top of a link list (edge list) called ActiveEdgeList (AEL) for each scan line in the ascending order of the X coordinates of the edges. Edge data in an edge list of an N-th scan line is sorted according to an edge list of an N−1-th scan line, which is a scan line preceding the N-th scan line.

To be more precise, if the edge data is sorted according to the X coordinates in the order of edges E1, E2, E3 in the edge list of the N-th scan line, when the scan line is changed, the X coordinates of the edges E1, E2, and E3 of an N+1-th scan line are obtained according to the X coordinate calculation processing. Then, the edges E1 to E3 are sorted according to the edge list of the N-th scan line and the obtained X coordinates.

Since the edges in the edge list of the N-th scan line are listed in the order of the edges E1, E2, E3, first, the X coordinate of the edge E3 is compared with the X coordinate of the edge E2 which is the edge that precedes the edge E3 on the N-th scan line. In this manner, it is determined whether the edge E3 precedes the edge E2 in the edge list of the N+1-th scan line. If the edge E3 precedes the edge E2, the X coordinate of the edge E3 is compared with the X coordinate of the edge E1 which is the preceding edge in the edge list of the N-th scan line. In this manner, it is determined whether the edge E3 precedes the edge E1 in the edge list of the N+1-th scan line.

According to the determination result of such comparison, the order of the edge E3 in the edge list of the N+1-th scan line is determined, and the link structure of the edge list is updated according to the determined order. This processing is executed for each edge and the edge list of the N+1-th scan line is updated.

When the comparison of the X coordinates of the edges is performed, if the edge data is not in the CPU cache, the CPU 205 needs to access the edge data stored in the main memory. However, if a copy of the edge data is stored in the CPU cache, since the CPU 205 can access the CPU cache instead of the main memory for the edge data, high speed processing can be realized. Such operation is a common operation of the CPU 205 connected to the CPU cache.

As described above, when the scan line is changed and the order of the X coordinates of the edges are changed or if a new edge appears or an edge disappears, it is necessary to update the link structure of the edge list. This processing is called edge sorting.

The edge list which has undergone the edge sort processing is subjected to the level processing. The edge data in the ascending order of the X coordinates and the level data are subjected to the level processing. This processing is called edge tracking.

When the rendering is completed, the edges are subjected to edge deletion processing.

<Level Processing>

The level processing is roughly divided into three types of processing.

Level addition is processing used for adding edge data to a link list. When the level processing is performed, whether an edge is a rendering target is determined based on edge direction information or clip information in the edge data obtained in the edge processing. If the edge is a rendering target, data of the corresponding edge is added to a link list called ActiveLevelList (ALL).

Level deletion is processing opposite to the level addition processing. If the edge as a rendering target is no longer determined as a rendering target based on the edge direction information or the clip information, the edge data is deleted from the ALL according to the level deletion processing.

The ALL is constantly sorted in the ascending order of the level numbers. When a level is added or deleted, the sort processing of the ALL, which is called "level sorting" is performed. The level data which has undergone the level sorting is subjected to the fill processing in span units.

<Fill Processing>

The fill processing is roughly divided into three types of processing.

Image scaling is processing for generating a colored pixel, if an enlargement ratio is designated for the bitmap image in the display list, based on the designation.

Image rotation is processing for generating a colored pixel, if rotation information is designated for the bitmap image in the display list, based on the designation.

Pixel generation is processing for generating a colored pixel, if a color value and change information indicating a degree of a change of color are designated in the display list, based on the designation.

<Composite Processing>

The composite processing includes one processing. When the composite processing is performed, the superposition processing designated in the display list is performed based on the vertically-structured relationship of the levels determined by the level processing and the pixels generated by the fill processing.

Each type of the above-described processing can be processed in parallel in units of span according to pipeline processing. This processing will be described with reference to FIGS. 3B and 3C.

FIG. 3B illustrates image data of one page. The level of an object 403 is the lowest. An object 402 is superimposed on the object 403. Further, an object 401 is superimposed on the object 402. Display lists of these three objects are already generated. The scan line rendering processing of image data of such a page is performed for each scan line.

The illustration in FIG. 3B is described in detail. On the first scan line of the page image data, since an object does not exist, a span 1-1 is processed. On the second scan line, since the object 402 exists and two edges are detected, spans 2-1, 2-2, and 2-3 are processed. On the third scan line, since the objects 401, 402, and 403 exist and six edges are detected, spans 3-1, 3-2, 3-3, 3-4, 3-5, 3-6, and 3-7 are processed. Similar processing is performed for the fourth and subsequent scan lines.

As illustrated in FIG. 3C, the span of each scan line is processed by the pipeline processing in the order of the edge processing, the level processing, the fill processing, and the composite processing.

According to the example in FIG. 3B, as illustrated in FIG. 3C, first, the span 1-1 of the first scan line is subjected to the edge processing and further subjected to the level processing. Next, the span 2-1 of the second scan line, which is the first span of the second scan line, is subjected to the edge processing and further subjected to the level processing. At timing the span 2-1 is subjected to the level processing, the span 1-1 is subjected to the fill processing. Similarly, as illustrated in FIG. 3C, the spans are processed in parallel.

<Edge Processing Method of Display List Including a Great Number of Edges>

In the description above, the rendering processing in a case where one object corresponds to each of the objects 401, 402, and 403 is described with reference to FIG. 3B. On the other hand, in FIGS. 4A to 4C, 1000 objects, overlapping one another, correspond to each of the objects 402 and 403. These objects are subjected to the edge sorting of the edge processing. The illustration in FIG. 4A looks as though it is the same as the illustration in FIG. 3B. However, FIG. 4A includes 1000 objects 402 overlapping one another at the same position as well as 1000 objects 403 also overlapping one another at the same position.

Figure 4A:
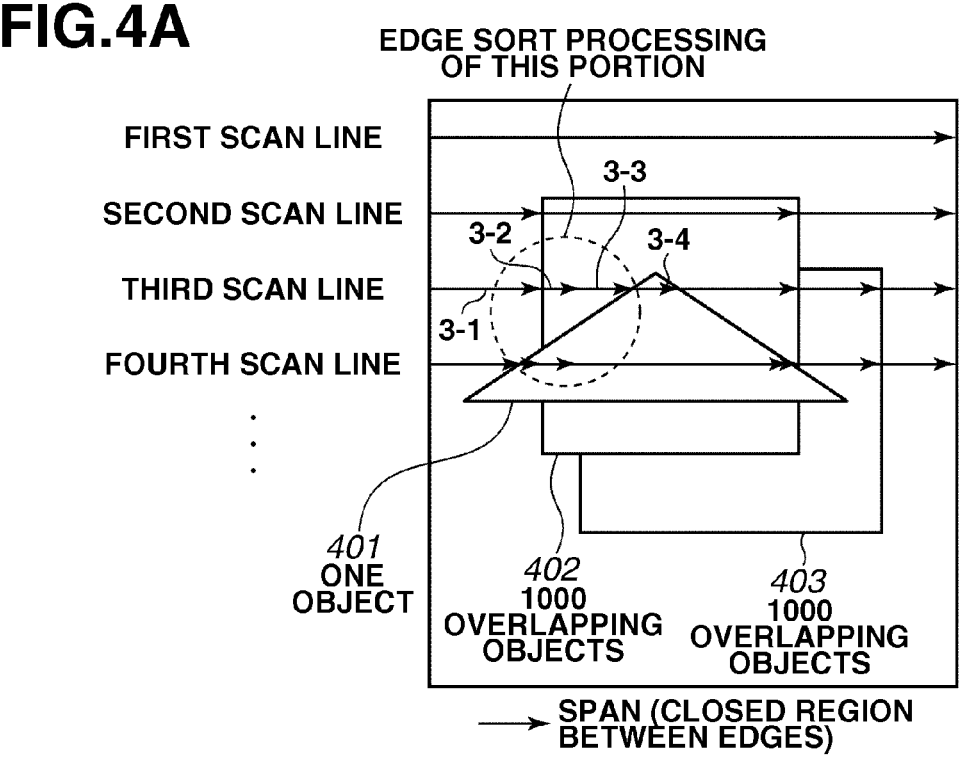
FIGS. 4A, 4B, and 4C illustrate edge processing when a large number of edges are included in a display list.
Figure 4B:
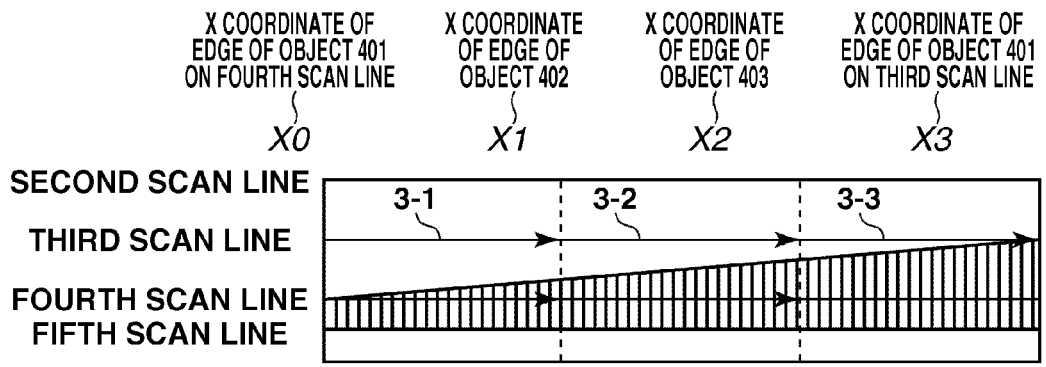
Figure 4C:
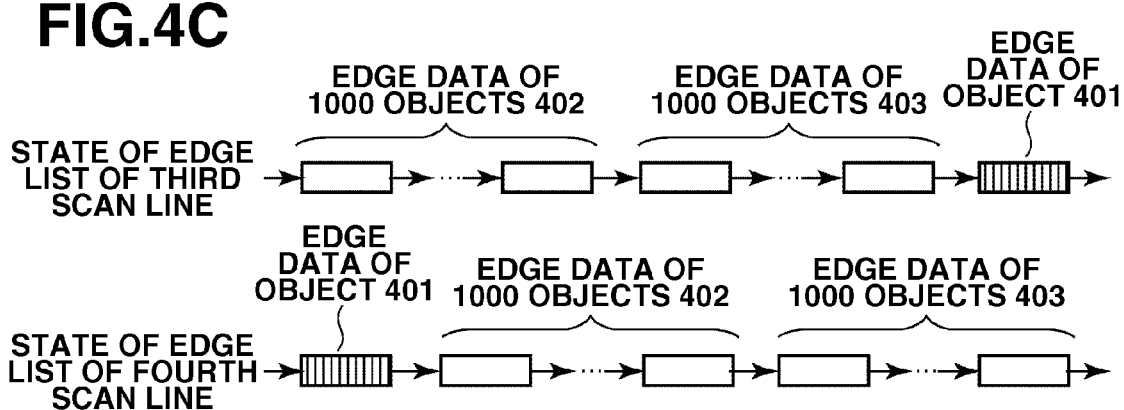

FIG. 4B is an enlarged illustration of the area close to the span 3-2 in FIG. 4A and enclosed by a circle with a broken line. In FIG. 4B, the portion indicated by vertical lines is the region of the object 401. Further, X0 is the X coordinate of the edge of the object 401 on the fourth scan line. X1 is the X coordinate of the edge of the object 402. X2 is the X coordinate of the edge of the object 403. X3 is the X coordinate of the edge of the object 401 on the third scan line. In other words, if the scan line proceeds from the third scan line to the fourth scan line, the edge of the object 401 traverses the 1000 objects 402 and the 1000 objects 403. Thus, as illustrated in FIG. 4C, according to the edge sort processing, the edge data of the object 401 in the edge list of the third scan line passes the edge data of the 1000 objects 402 and the edge data of the 1000 objects 403. Then, as the edge list of the fourth scan line shows, the edge data of the object 401 is moved to the top of the edge list.

In FIG. 4C, as described above, the edge data that appears in the processing is linked in the ascending order of the X coordinates as the AEL. On the third scan line, the 1000 edges on the left side of the object 402, the 1000 edges on the left side of the object 403, and an edge on the left side of the object 401 are lined.

When the processing proceeds from the third scan line to the fourth scan line, since the X coordinate of the edge on the left side of the object 401 is changed from X3 to X0, the edge is linked to a predetermined location after the 1000 edges on the left side of the object 402 and the 1000 edges on the left side of the object 403 are subjected to the edge sort processing.

If a link is to be followed, the edge data in the main memory is sequentially accessed and the X coordinate of each edge is compared with the X coordinate of an edge as the target of the sort. If the edge data includes a small number of edges, all the edge data which has been accessed once or more by the CPU in all the scan lines will be stored in the CPU cache. Thus high speed processing can be realized.

However, if the edge list includes a great number of edges as is the example illustrated in FIG. 4A, all the edge data cannot be stored in the CPU cache. Thus, the CPU directly accesses the main memory for the edge data that does not exist in the CPU cache. Accordingly, processing time is extremely increased. Especially, as described in the example above, if the edge is densely distributed in a local area (e.g., 2000 edges are distributed in the vicinity of the X coordinate of the edge of the object 402), even if the movement of the edge is small, a great number of edges needs to be accessed for the edge sorting. This greatly increases the processing time.

<Edge Layer Classification Processing>

Edge layer classification processing according to the present exemplary embodiment will be described with reference to FIG. 5. In the description below, a case where the 1000 objects 402 and the 1000 objects 403 overlap one another at the same position as is described in <Edge processing method of display list including a great number of edges> will be described.

The objects included in the display lists which have been input are the 1000 objects 403 having the level numbers 1 to 1000, the 1000 objects 402 having the level numbers 1001 to 2000, and one object corresponding to the object 401 having the level number 2001. One object includes two edges on the left and the right sides of the object. According to these display lists, since the number of objects is 2001, the number of edges will be 4002.

If the memory size of the CPU cache is such that edge data corresponding to the 2000 edges can be stored in the CPU cache and edge data corresponding to edges more than 2000 overflows, it means that if one layer includes up to 1000 objects (data of 2000 edges), all the edge data can be stored in the CPU cache. The number of edges depends on the memory size of the CPU cache and the data size of each edge. Thus, if the image processing apparatus 100 is changed, the number of edges which can be stored in the CPU cache will also be changed.

First, the control unit 101 determines the edges of the objects in the display lists which have been input and the level numbers of the objects, and further determines the layer to which each edge should belong. In this case, the 1000 objects 403 with the level numbers 1 to 1000 belong to a first layer, the 1000 objects 402 with the level numbers 1001 to 2000 belong to a second layer, and the object 401 belongs to a third layer.

The bitmap which is generated for each layer needs to be superimposed from the lower layer. Thus, it is always necessary to start the rendering from the first layer. However, as for the objects of each layer, since the level processing is performed, it is not necessary to process the objects in the ascending order of the object level numbers. Accordingly, it can be processed in the order the edges appear.

Although the processing of each layer is performed according to the rendering processing method described in <Rendering processing method of display list>, when the display list is interpreted, only the edge that belongs to the layer which is being processed is loaded into the main memory and the processing is performed. This is one of the features.

As illustrated in the page image of the first layer in FIG. 5, after a bitmap image is generated according to the rendering processing of the first layer (see illustration at the top of FIG. 5), the processing of the second layer starts. As is the first layer processed by the rendering processing, the edge which only belongs to the second layer is loaded into the main memory and the rendering processing is performed. In this manner, the bitmap image of the second layer is generated. Then, the bitmap image of the second layer is superimposed on the bitmap image of the first layer. According to this process, an image of the second layer superimposed on the first layer is generated (illustration at the middle of FIG. 5). The rendering processing and the superposition processing will be similarly repeated until the processing of the top layer is completed.

<Flow of Edge Layer Classification Processing>

Now, edge layer classification rendering processing in steps S1006 and S1009 in FIG. 9 according to the present exemplary embodiment will be described with reference to the flowchart in FIG. 6.

In step S703, the control unit 101 receives a display list of one page to be subjected to the rendering processing and the number of edges in the display list, and stores the edge data in the main memory.

In step S704, based on the memory size of the CPU cache and the data size of one piece of edge data (also called a unit data size), the control unit 101 calculates the number of edges which is less likely to cause a cache miss in the edge processing. A method of such calculation is described in <Calculation method of number of edges> below. Then, the control unit 101 sets the obtained number of edges as a reference value used for the determination processing in step S705. The value which is set as the reference value is not limited to the above-described value. For example, it can be a value obtained by multiplying the calculated number of edges by a coefficient r ($0 \leq r \leq 1$) or a predetermined value which is assumed not to cause a cache miss.

In step S705, the control unit 101 compares the number of edges included in the display list received in step S703 and the reference value set in step S704. In other words, in step S705, the control unit 101 determines, in the scan line rendering, especially the edge sort processing, whether there is a possibility of a cache miss when the rendering processing of one or more objects included in the image data is performed. Thus, the control unit 101 determines the frequency, the number of times, or the possibility of the cache miss when one or more objects included in the image data are subjected to the scan line rendering, especially the edge sort processing.

If the number of edges included in the display list received in step S703 is less than the reference value set in step S704 (NO in step S705), the control unit 101 determines that there is no possibility of a cache miss of the CPU in the rendering processing, and the processing proceeds to step S717. In step S717, the control unit 101 performs the normal rendering processing regardless of the cache miss, which is described above with reference to <Rendering processing method of display list> in FIG. 3. According to the normal rendering processing, a bitmap corresponding to one or more objects included in the image data is generated. Then, the processing ends.

If the number of edges included in the display list received in step S703 is equal to or greater than the reference value set in step S704 (YES in step S705), the control unit 101 determines that there is a possibility of a cache miss of the CPU cache in the rendering processing, and the processing proceeds to step S706. In step S706, the control unit 101 manages the edge data according to the level number.

In step S707, regarding the edge data included in the display list, the control unit 101 determines the layer to which each edge belongs. Since the edge data is managed by the level number in step S706, the edge data included in the display list is classified by the layer from the lowest level according to the reference value set in step S704 (e.g., the number of edges calculated in step S704). Classifying the edge data by the reference value is an example and the layer can be classified according to a value, being a half of the reference value. In other words, the layer classification of the edge data is performed by a unit which can reduce the frequency, the number of times, or the probability of the cache miss of the CPU cache when the scan line rendering, especially the edge sort processing, is performed. The layer classification processing of edge data is, in other words, processing that classifies a plurality of objects into a plurality of groups in order from the lowest level. As a result of this processing, the control unit 101 manages to which layer the edge data is to be classified. At this point in time, the control unit 101 determines the layer to be processed is the lowest layer.

In step S708, the control unit 101 interprets the display list.

In step S709, the control unit 101 determines the edge data which belongs to the layer to be processed out of the edge data in the interpreted display list.

In step S710, the control unit 101 loads the edge data determined in step S709 into the main memory.

In step S711, the control unit 101 performs the edge processing described in <Rendering processing method of display list>. In other words, out of the edge data in the display list stored in the DL memory, the control unit 101 performs the scan rendering processing of the edge data of the amount which does not cause the cache miss in the edge sorting of the edge processing.

In step S712, the control unit 101 performs the level processing, the fill processing, and the composite processing described in <Rendering processing method of display list> by pipeline processing, and generates a bitmap page image of the layer to be processed.

In step S714, the control unit 101 superimposes the bitmap page image of the layer to be processed which has been generated according to processing in steps S708 to S712 on the bitmap page image of the already rendered background layer (lower layer).

In step S715, the control unit 101 determines whether the rendering processing of all the layers in the display lists to be processed is completed. If the rendering processing is completed (YES in step S715), the processing ends. On the other hand, if the rendering processing of all the layers is not yet completed (NO in step S715), the processing returns to step S708 and an upper layer will be processed.

The edge layer classification rendering processing is as described above. The important point is that the edge layer classification rendering processing is processing for classifying a plurality of objects into groups and performing the scan line rendering for each of such groups to prevent the cache miss from occurring.

<Calculation Method of Number of Edges>

A calculation method of the number of edges that does not cause the cache miss will be described. For example, if the memory size of the CPU cache is 128 kilobytes and the data size of one edge is 64 bytes, 2048, which is obtained by dividing the memory size of the CPU cache by the data size of one edge, will be the number of edges that does not cause a cache miss.

<Effect>

FIG. 10A illustrates a relation between the number of edges and the time necessary in the edge sort processing in a case where the edge layer classification rendering of the present exemplary embodiment is not executed. In FIG. 10A, since the edge sort processing is performed regardless of the memory size of the CPU cache, when display lists including a large number of edges are processed, a cache miss frequently occurs and processing time extremely increases. On the other hand, FIG. 10B illustrates the relation of the number of edges and the processing time necessary in the edge sorting in a case where the edge layer classification rendering of the present exemplary embodiment is performed. In FIG. 10B, since the edge sorting processing is performed considering the memory size of the CPU cache, even when display lists including a large number of edges are processed, the possibility of the cache miss is reduced. Thus, the time necessary in the edge sort processing increases substantially linearly with the number of edges.

Considering the memory size of the CPU cache, the edge layer classification rendering processing according to the present exemplary embodiment described above determines a group of display lists to be subjected to the scan rendering processing at a time as a layer. The scan line rendering processing is performed for each layer and a bitmap page image is generated for each layer. Then, the superposition of the bitmap images is performed. Thus, the cache miss that occurs when the scan rendering processing (especially, the edge sort processing) is performed can be reduced, and high speed rendering processing can be realized.

According to the present exemplary embodiment, the control unit 101 performs the determination processing in step S705 by comparing the number of edges and the reference value obtained in steps S703 and S704 in FIG. 6. However, the present invention is not limited to such an example. The cache miss which may occur in the edge sort processing is caused when the edge data which is to be sorted overflows the CPU cache. Thus, the determination processing in step S705 can be performed based on the information of the data size of the edge data of the plurality of objects to be rendered. In other words, the determination processing in step S705 can be performed by comparing the information of the data size of the edge data of the plurality of objects to be rendered (also called determination information) and a reference value used for assuming the occurrence of the cache miss. Thus, the determination processing in step S705 can be performed based on the information of the plurality of objects in the image data which is associated with the frequency, the number of times, or the probability of the occurrence of the cache miss, and a reference value. As another example of the information of the plurality of objects in the image data which is associated with the frequency, the number of times, or the probability of the occurrence of the cache miss according to the present exemplary embodiment, there is information of the number of objects included in the image data and the data size of the edge of the plurality of objects.

For example, the control unit 101 determines that there is a possibility of a cache miss if the number of objects exceeds the reference value. Further, for example, if the data size of one edge is changeable, the control unit 101 actually obtains the data size of the edge of a plurality of objects. Then, the control unit 101 determines that there is a possibility of a cache miss when the data size exceeds the reference value (e.g., memory size of the CPU cache). The reference value is a predetermined threshold value appropriate for each determination method.

According to the first exemplary embodiment, the image processing apparatus 100 performs the edge layer classification rendering processing of the image data of the entire page. The image processing apparatus 100 according to the present exemplary embodiment divides page image data into band areas (simply called bands) where the edges are dense and band areas where the edges are not dense. Then, the edge layer classification rendering processing is performed only for the bands where the edges are densely distributed. Further, the image processing apparatus 100 according to the present exemplary embodiment performs the normal scan line rendering processing, which does not particularly consider the cache miss described in FIG. 3, for the bands other than the bands where the edges are densely distributed.

In other words, regarding the portions where the edges are not densely distributed, the normal scan line rendering processing is performed instead of the superposition processing of the bitmap images. Since the images which are subjected to the superposition processing are partial band images, high speed processing can be realized compared to a case where the entire bitmap page images are superimposed.

The present exemplary embodiment described below is described using the image processing apparatus 100 according to the first exemplary embodiment. Unless otherwise specified, the configuration of the image processing apparatus is similar to the image processing apparatus according to the first exemplary embodiment.

<Layer Classification Processing Exclusively for Edge Densely-Distributed Portion>

Layer classification processing exclusively for an edge densely-distributed portion will be described with reference to FIG. 7.

Regarding <Edge layer classification processing> according to the first exemplary embodiment, the whole region is subjected to the layer classification, and the scan rendering processing and the superposition processing are performed for each layer. Accordingly, the superposition processing is performed for the regions where the edges are not densely distributed. As described in <Edge processing method of display list including a great number of edges>, the present exemplary embodiment is described based on the assumption that 1000 objects 402 and 1000 objects 403 overlap each other at the same positions as the objects described in <Edge layer classification processing> according to the first exemplary embodiment.

According to the present exemplary embodiment, the band where the edges are densely distributed is determined not only by using the number of edges included in the display list but by using position information where the edges are loaded and height information of the edges. According to <Edge layer classification processing> of the first exemplary embodiment, the interpretation is repeatedly performed from the top of the display list for each layer. According to the present exemplary embodiment, the band which is determined that the edges are not densely distributed (the first scan line in FIG. 7) is subjected to the scan rendering processing of all spans regardless of the layer. Before processing an edge densely-distributed band (densely-distributed band 801) of the second to the fifth scan lines, the scan rendering processing is performed by using the edge data that belongs to the first layer. Then, the scan rendering is performed by using the edge data of the second layer. Subsequently, the superposition processing of the bitmap image of the densely-distributed band 801 of the first layer on the densely-distributed band 801 of the second layer is performed. Such processing is repeated until the top layer is processed. Since the sixth and the subsequent scan lines belong to a band where the edges are not densely distributed, the scan rendering processing is performed, regardless of the layers, by using all the edge data corresponding to this band.

In other words, processing similar to the edge layer classification rendering processing performed according to the first exemplary embodiment is performed exclusively for the densely-distributed band 801. Since the superposition processing is performed only for the band which needs the classification of the layers, the rendering processing can be performed at a higher speed.

<Flow of Layer Classification Processing Exclusively for Edge Densely-Distributed Portion>

Now, the layer classification processing of the present exemplary embodiment will be described with reference to the flowchart illustrated in FIG. 8. The processing executed by the image processing apparatus 100 of the present exemplary embodiment described below is similar to the processing in FIG. 9 described above according to the first exemplary embodiment except for steps S1006 and S1009.

In step S903, the control unit 101 receives a display list to be subjected to the rendering processing and information of the edges included in the display list such as the number of edges, the edge load position, and the edge height, and stores them in the main memory. The edge load position of the edge is the scan line on which the edge appears. Further, the edge height is the number of scan lines the edge continuously exists from the edge load position.

Step S904 is similar to the processing in step S704.
Step S905 is similar to the processing in step S705.
Step S906 is similar to the processing in step S706.
Step S907 is similar to the processing in step S707.

In step S908, the control unit 101 determines the edge densely-distributed band based on the load position and the height of the edge included in the display list obtained in step S903. A method of identifying the edge densely-distributed band will be described in detail according to <Edge densely-distributed band identification method> below. In this flowchart, the control unit 101 sets the top band of the page image as the band to be processed and sets the lowest layer as the layer to be processed.

Step S909 is similar to the processing in step S708.

In step S910, the control unit 101 determines whether the band to be processed is the edge densely-distributed band identified in step S908.

In step S910, if the band of to be processed is the edge densely-distributed band (YES in step S910), the processing proceeds to step S911. In step S911, the control unit 101 determines the edge data which belongs to the layer to be processed out of the edge data included in the interpreted display list.

In step S912, the control unit 101 loads the edge data determined in step S911 into the main memory.

In step S913, the control unit 101 performs the edge processing described in <Rendering processing method of display list> according to the first exemplary embodiment.

In step S914, the control unit 101 performs the level processing, the fill processing, and the composite processing described in <Rendering processing method of display list> according to the first exemplary embodiment, and generates a bitmap image of the layer to be processed of the band to be processed.

In step S915, regarding the band to be processed, the control unit 101 superimposes the bitmap image generated in step S914 on the bitmap image of the lower layer which has already been rendered.

In step S916, regarding the band to be processed, the control unit 101 determines whether the rendering processing of all the layers in the display list which is being processed is completed. If the rendering processing is completed (YES in step S916), the processing proceeds to step S920. If the rendering processing is not yet completed (NO in step S916), the layer to be processed is changed to an upper layer, and the processing returns to step S909.

In step S910, if the control unit 101 determines that the band to be processed is not the edge densely-distributed band (NO in step S910), the processing proceeds to step S917. In step S917, the control unit 101 loads the edge data of the band to be processed into the main memory.

In step S918, the control unit 101 performs the edge processing described in <Rendering processing method of display list> according to the first exemplary embodiment.

In step S919, the control unit 101 performs the level processing, the fill processing, and the composite processing described in <Rendering processing method of display list> according to the first exemplary embodiment, and generates a page of the layer which is being processed.

In step S920, the control unit 101 determines whether the interpretation of the display lists of all the bands is completed. If the interpretation is completed (YES in step S920), the processing ends. If the interpretation is not yet completed (NO in step S920), the band to be processed is changed to an adjacent unprocessed band, and the processing returns to step S909.

<Edge Densely-Distributed Band Identification Method>

The edge densely-distributed band identification method in step S908 will be described. First, the control unit 101 determines an arbitrary band height. The band height is, for example, 32 lines or 64 lines. Next, the control unit 101 counts the number of edges included in each band for each band according to the line position that the edge appears in the display list and the height of the edge. For example, if an edge with a height of 128 lines appears on the first scan line and the band height is 32, the edge exists on the first band to the fourth band. The control unit 101 performs this kind of calculation for each edge and calculates the number of edges included in each band. Then, the control unit 101 determines the band whose number of edges which has been obtained exceeds a predetermined value (e.g., the number of edges calculated in step S904) as an edge densely-distributed band.

As described above, according to the present exemplary embodiment, the image data is divided into a plurality of bands, and whether the edge layer classification rendering processing or the normal rendering processing is to be performed is determined for each band. Then, each band is rendered according to the rendering method set for each band. In other words, although whether the edge layer classification rendering processing or the normal rendering processing is to be performed is determined in units of page image according to the first exemplary embodiment, whether the edge layer classification rendering processing or the normal rendering processing is to be performed is determined in units of band area before the rendering is executed according to the present exemplary embodiment.

The normal scan line rendering is performed instead of the superposition processing of the bitmap images for the portion where the edges are not densely distributed. Since the partial superposition of the band images is performed, processing can be performed at a higher speed compared to when superposition of the bitmap page images is performed. Further, regarding the portion where the edges are dense, the bitmap is generated by high speed rendering processing while reducing the occurrence of the cache miss. Accordingly, high speed rendering processing of the page image can be realized.

Although various exemplary embodiments are described above in detail, the present invention can be applied to a system including a plurality of devices, or to an apparatus including a single device. For example, a scanner, a printer, a host computer, a copier, a multifunction peripheral or a facsimile machine can constitute exemplary embodiments of the present invention.

The above-described exemplary embodiments can also be achieved by providing a software program that realizes each function of the aforementioned exemplary embodiments, directly or by remote operation, to the system or the apparatus, and by reading out and executing the provided program code with a computer included in the system.

Thus, the program code itself which is installed in the computer to realize the function and the processing of the present invention on the computer constitutes the above-described exemplary embodiments. In other words, the computer-executable program configured to realize the function and the processing of the present invention itself constitutes an exemplary embodiment of the present invention.

In this case, a form of the program can be in any form, such as object code, a program executed by an interpreter, or script data supplied to an operating system (OS) so long as the computer-executable program has a function of a program.

The storage medium for providing program codes may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Further, the program can be downloaded by an Internet/intranet website using a browser of a client computer. The computer-executable program according to an exemplary embodiment of the present invention or a file including a compressed program and an automated install function can be downloaded from the website to a recording medium, such as a hard disk. Further, the present invention can be realized by dividing program code of the program according to an exemplary embodiment into a plurality of files and then downloading the files from different websites. In other words, a World Wide Web (WWW) server by which a program file used for realizing the function according to an exemplary embodiment is downloaded to a plurality of users can also constitute an exemplary embodiment of the present invention.

Furthermore, the program of an exemplary embodiment of the present invention can be encrypted, stored in a recording medium, such as a CD-ROM, and distributed to users. In this case, the program can be configured such that only the user who satisfies a predetermined condition can download an encryption key from a website via the Internet/intranet, decrypt the encrypted program by the key information, execute the program, and install the program on a computer.

Further, the functions of the aforementioned exemplary embodiments can be realized by a computer which reads and executes the program. An operating system (OS) or the like running on the computer can perform a part or whole of the actual processing based on the instruction of the program. This case can also realize the functions of the aforementioned exemplary embodiments.

Further, a program read out from a storage medium can be written in a memory provided in a function expansion board of a computer or a function expansion unit connected to the computer. Based on an instruction of the program, the CPU of the function expansion board or the function expansion unit can execute a part or all of the actual processing. The functions of the aforementioned exemplary embodiments can be realized in this manner.

Even in a case where complicated image data includes a large number of objects or a large number of edges, since the rendering processing is performed after the objects are classified into groups, the possibility of the cache miss in the rendering processing can be reduced and the processing time can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-137915 filed Jun. 19, 2012, which is hereby incorporated by reference herein in its entirety.

What is claimed is:

1. A printing apparatus comprising:
an obtaining unit configured to obtain a display list of a page including objects, to each of which a different level number is assigned, the level number corresponding to an order from a background level;
a classifying unit configured to classify the objects included in the display list to a plurality of groups on a basis of the level numbers assigned to the objects and a threshold number, in a case where a maximum level number of the level numbers is more than the threshold number, so that a number of objects classified to each of the groups is equal to or less than the threshold number;
a rendering unit configured to perform rendering of the page by generating raster images sequentially, each of which is generated on a scan line basis from one or more objects classified to each different one of the groups, in a case where the maximum level number is more than the threshold number; and
a print unit configured to print an image on a sheet on a basis of the rendered page,
wherein, in the classification, the classifying unit classifies, to a same single group of the groups, one or more objects to which level numbers between N times the threshold number and N+1 times the threshold number are assigned, wherein N is an integer.

2. The printing apparatus according to claim 1, wherein each of the objects includes a piece of edge data.

3. The image processing apparatus according to claim 2, wherein the generation of each raster image on the scan line basis is performed by scan line rendering which includes, for each scan line, identifying a plurality of pieces of edge data of at least one object for a target scan line and sorting the identified pieces of edge data in an ascending order with regard to X coordinates of the identified pieces of edge data.

4. The printing apparatus according to claim 1, wherein, in a compositing, the rendering unit composites the generated raster images corresponding respectively to the groups in the order from the background level.

5. The printing apparatus according to claim 1, wherein each of the generated raster images has not been subject to lossy compression.

6. The printing apparatus according to claim 1, further comprising:
a display list generation unit configured to generate display lists corresponding respectively to the plurality of objects used for rendering the plurality of objects; and
a fallback determination unit configured to determine that fallback processing is to be executed if, when the display list generation unit sequentially generates display lists corresponding respectively to the plurality of objects, a data size of the generated display list exceeds a predetermined value,
wherein if the fallback determination unit determines that the fallback processing is to be executed, the rendering unit performs lossy compression on a bitmap obtained by executing rendering of display lists of some objects out of the plurality of objects which have been generated, and generates a bitmap corresponding to the plurality of objects by superimposing the bitmap obtained by executing rendering of display lists of remaining objects of the plurality of objects on the bitmap which has been irreversibly compressed.

7. The printing apparatus according to claim 1, further comprising a determination unit configured to determine whether the maximum level number is more than the threshold number.

8. The printing apparatus according to claim 7, wherein the rendering unit includes a CPU and a cache coupled with the CPU,
wherein the CPU performs at least one part of the rendering using the cache, and
wherein the threshold number is predetermined in consideration of a size of the cache.

9. The printing apparatus according to claim 8, wherein the threshold number is predetermined in consideration of a size of the cache and a data size of one object.

10. The printing apparatus according to claim 1, further comprising a division unit configured to divide image data including the plurality of objects into a plurality of band areas, each of the band areas including a plurality of scan lines, wherein the rendering unit executes processing in units of band area for each band area divided by the division unit.

11. The printing apparatus according to claim 1, wherein the classifying unit classifies, to a first group, one or more objects to which level numbers equal to or less than the threshold number are assigned, and classifies, to a second group, one or more objects to which level numbers more than the threshold number are assigned, the first and second groups being different.

12. The printing apparatus according to claim 1, further comprising:
a reception unit configured to receive PDL data including the plurality of objects, and
wherein the obtaining unit obtains the display list by generating the display list from the received PDL data.

13. The printing apparatus according to claim 2, wherein the generation of each raster image on the scan line basis is performed by scan line rendering which includes, for each span included in each scan line, identifying a plurality of pieces of edge data of at least one object for a target span and sorting the identified pieces of edge data in an ascending order with regard to level numbers corresponding to the at least one object.

14. The printing apparatus according to claim 1, wherein the rendering of the page is scan line rendering including level-sort processing for sorting edge data of the plurality of objects for each scan line in an ascending order with regard to a level number of edge data.

15. The printing apparatus according to claim 1, wherein, in a case where the maximum level number is not more than the threshold number, the classifying unit is controlled not to classify the objects to a plurality of groups and the rendering unit is controlled to perform rendering of the page by generating a bitmap from the objects on a scan line basis.

16. The printing apparatus according to claim 1, wherein the rendering unit performs composite processing using the raster image previously generated, in the generating of a target raster image.

17. A printing method executed by a printing apparatus, comprising:
obtaining a plurality of image objects included in a page, wherein a level number is assigned to each of the plurality of image objects and level numbers assigned to the plurality of image objects are different to each other and indicate order of the plurality of image objects from a background on the page to a foreground on the page;

extracting first image objects from among the plurality of image objects according to level numbers assigned to the first image objects, wherein the level numbers assigned to the first image objects are smaller than a threshold level number;

generating a first bitmap image based on the extracted first image objects;

extracting second image objects from among the plurality of image objects according to level numbers assigned to the second image objects, each of the level numbers assigned to the second image objects is equal to or larger than the threshold level number;

generating a second bitmap image based on the extracted second image objects and the generated first bitmap image so that the extracted second image objects are superimposed on the generated first bitmap image; and printing an image based on the generated second bitmap.

18. The printing method according to claim 17, wherein the lower level number assigned to an image object is, the closer to the background on the page the image object is.

19. The printing method according to claim 17, wherein the first bitmap image for a scan line is generated based on the extracted first image objects for the scan line and the second bitmap image for the scan line is generated by superimposing the second image objects for the scan line on the generated first bitmap image for the scan line.

20. The printing method according to claim 17, wherein the extracting of the first image objects is performed by referring to the threshold level number and extracting image objects, to which level numbers smaller than the referred threshold level number are assigned, from among the plurality of image objects as a first group, and the extracting of the second image objects is performed by referring to the threshold level number and extracting image objects, to which level numbers equal to or more than the referred threshold level number and two times smaller than the referred threshold level number are assigned, from among the plurality of image objects as a second group.

21. A printing apparatus comprising:

an obtaining unit configured to obtain a plurality of image objects included in a page, wherein a level number is assigned to each of the plurality of image objects and level numbers assigned to the plurality of image objects are different to each other and indicate order of the plurality of image objects from a background on the page to a foreground on the page;

a rendering unit configured to generate a bitmap of the page by rendering of the plurality of image objects;

a printer unit configured to print an image based on the generated bitmap, wherein the rendering of the plurality of the image objects includes:

a first rendering by extracting first image objects from among the plurality of image objects according to level numbers assigned to the first image objects and generating a first bitmap image based on the extracted first image objects, wherein the level numbers assigned to the first image objects are smaller than a threshold level number; and a second rendering by extracting second image objects from among the plurality of image objects according to level numbers assigned to the second image objects and generating a second bitmap image based on the extracted second image objects and the generated first bitmap image so that the extracted second image objects are superimposed on the generated first bitmap image, wherein each of the level numbers assigned to the second image objects is equal to or larger than the threshold level number.

22. The printing apparatus according to claim 21, wherein the lower level number assigned to an image object is, the closer to the background on the page the image object is.

23. The printing apparatus according to claim 21, wherein the first rendering generates the first bitmap image for a scan line from the extracted first image objects for the scan line, and the second rendering generates the second bitmap image for the scan line by superimposing the second image objects for the scan line on the generated first bitmap image for the scan line.

24. The printing apparatus according to claim 21, wherein the first rendering extracts the first image objects by referring to the threshold level number and extracting image objects, to which level numbers smaller than the referred threshold level number are assigned, from among the plurality of image objects as a first group, and the second rendering extracts the second image objects by referring the threshold level number and extracting image objects, to which level numbers equal to or more than the referred threshold level number and two times smaller than the referred threshold level number are assigned, from among the plurality of image objects as a second group.

* * * * *